United States Patent [19]

Matsuda

[11] Patent Number: 4,893,145

[45] Date of Patent: Jan. 9, 1990

[54] FOCUSING OPERATION CHANGEOVER APPARATUS FOR A CAMERA

[75] Inventor: Atsushi Matsuda, Tokyo, Japan

[73] Assignee: Asahi Kogaku Kogyo K.K., Tokyo, Japan

[21] Appl. No.: 148,700

[22] Filed: Jan. 26, 1988

[30] Foreign Application Priority Data

Feb. 5, 1987 [JP] Japan .................................. 62-25673

[51] Int. Cl.[4] ............................ G03B 3/10; G03B 7/02
[52] U.S. Cl. .................................. 354/400; 354/195.1; 354/195.13; 350/255
[58] Field of Search ..................... 354/400, 409, 195.1, 354/195.12, 195.13, 289.11; 350/255

[56] References Cited

U.S. PATENT DOCUMENTS

| 4,272,174 | 6/1981 | Terramoto et al. | 354/195.1 |
| 4,309,077 | 1/1982 | Tomori | 354/195 X |
| 4,333,712 | 6/1982 | Tomori | 350/430 |
| 4,413,894 | 11/1983 | Miki et al. | 354/195.12 |
| 4,461,544 | 7/1984 | Isobe et al. | 354/195.1 X |
| 4,553,817 | 11/1985 | Ando et al. | 354/400 X |

OTHER PUBLICATIONS

U.S. Ser. No. 171,748, Hama, 3/22/88.

Primary Examiner—W. B. Perkey
Attorney, Agent, or Firm—Sandler & Greenblum

[57] ABSTRACT

A group of photographic lenses are disposed in a lens barrel in such a way as to be freely movable back and forth in the direction of the optical axis thereof and the group of photographic lenses are driven by an automatic focusing means in accordance with the range of a distance from an object, whereby automatic focusing is attained. In addition, a manual control device is provided for moving the photographic lenses in the direction of the optical axis thereof. Also a connection between the manual control device and the photographic lenses is cut off by controlling a changeover device.

19 Claims, 4 Drawing Sheets

FOCUSING OPERATION CHANGEOVER APPARATUS FOR A CAMERA

BACKGROUND OF THE INVENTION

1. Field of the Invention

This invention relates to a focusing apparatus for a camera, and more particularly to a focusing operation changeover apparatus provided in a motor-driven auto focus type camera having a manual control device for manual focusing.

2. Description of the Related Art

Generally, an auto focus type camera has a motor for moving back and forth a group of photographic lenses in the direction of the optical axis thereof, whereby automatic focusing is accomplished through control of rotation of the motor in accordance with the range of distance from an object to the camera. However, manual focusing is required in some circumstances. To meet this requirement, a control ring connected to the photographic lenses for manual focusing is also provided on the lens barrel of a camera, and rotational operation of the control ring moves the photographic lenses back and forth in the direction of the optical axis thereof, whereby manual focusing is enabled.

With such a focusing apparatus, however, when automatic focusing is started, the manual control ring is also made to rotate simultaneously. Consequently, if the user's hand is touching the control ring at that time, the motor and intermediary connecting members have a tremendous load imposed on them, which disadvantageously causes failure and malfunction in focusing. In most cases, in order to avoid this, the manual control ring is disposed at such a position that it is most unlikely that the ring will be carelessly touched by the hand. But this results in another disadvantage in that operation of the ring is very difficult at the time of manual operation.

Also with, an interchangeable lens having a long lens barrel such as a telephoto lens, a member is often provided for the purpose of covering a manual control ring so as to avoid careless touching of the ring by a hand. However, with a device of this type, the member must be separately provided for covering the manual control ring and this member must be made longer and larger than the control ring, which needs to be a certain length from the view-point of operability of the ring at the time of manual operation. This means that the lens barrel must be made larger, which makes it difficult for photos to be taken while the camera is being held by hand. In addition, since at the time of an automatic focusing operation the motor is forced to rotate the large manual operation ring, it has a big load imposed on it, which also results in the disadvantage that there is a remarkable reduction in the life of the motor.

SUMMARY OF THE INVENTION

An object of this invention is to provide a focusing operation changeover apparatus for a camera wherein a manual focusing control ring is able to be disposed at a position in which easy operation thereof is attained and wherein a motor is relieved of the big load which it would otherwise have undergone at the time of an automatic focusing operation.

According to the present invention, a focusing operation changeover apparatus is provided for a camera which comprises a group of photographic lenses consisting of at least one part of an entire group of photographic lenses and arranged in such a way as to be freely movable therein back and forth in the direction of the optical axis thereof, an automatic focusing device for moving the group of photographic lenses back and forth in accordance with the range of distance of the camera from an object so as to perform automatic focusing, a manual control device for moving the group of photographic lenses back and forth in the direction of the optical axis thereof, and a changeover device for cutting off the connection between the manual control device and the group of photographic lenses.

BRIEF DESCRIPTION OF THE DRAWINGS

The present invention may be more fully understood from the description of a preferred embodiment of the invention set forth below, together with the accompanying drawings, in which.

DESCRIPTION OF THE PREFERRED EMBODIMENT

Figure 1:
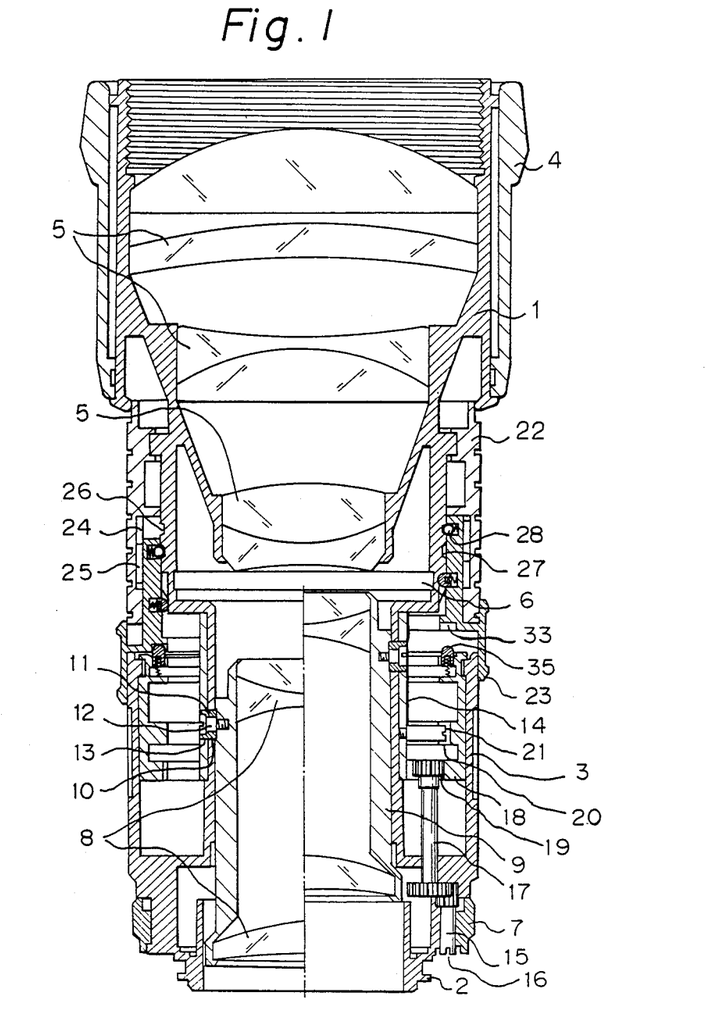
FIG. 1 is a cross-sectional side view of a lens barrel provided with the focusing operation changeover apparatus.

Referring to Figures, FIG. 1 is a cross-sectional side view showing the whole structure of the lens barrel provided with the focusing operation changeover apparatus, and the right half and the left half portion thereof respectively show different operating conditions. In FIG. 1, the upper side thereof is to be regarded as facing an object to be photographed, and in FIGS. 2 to 7, the left side thereof is to be regarded as facing an object to be photographed.

Reference numeral 1 shows a fixed lens barrel, on the rear end of which a claw 2 is formed so as to allow it to be connected to and fixed in a lens mount provided on a camera body. A lens shade is mounted on the outer periphery of the tip of the lens barrel, and a group of fixed photographic lenses 5 are securely disposed in the distal end half portion of the barrel. Reference numerals 6 and 7 respectively represent an aperture stop and a diaphragm ring for setting the opening degree of the aperture stop. Since these are not related directly to the present invention, detailed description of them is omitted.

A movable lens barrel 9 in which is secured a group of movable photographic lenses 8 is fitted in the rear half portion of the fixed lens barrel 1 in such a way as to be freely movable back and forth in the direction of the optical axis thereof (in the up or down direction in FIG. 1). The fixed lens barrel 1 has a guide groove 10 formed thereon in the diagonal direction with respect to the optical axis, through which a roller 11 rotatably provided on the movable lens barrel 9 protrudes outwardly. A machine screw 12 is used to mount the roller 11 on the movable lens barrel 9 and serves as a rotation shaft about which the roller rotates. Fitted over the periphery of this portion of the fixed lens barrel 1 is a cam barrel 14 having a cam groove 13 formed therein, and the head of the roller 11 is brought into engagement with the groove, whereby rotation of the cam barrel 14 enables the movable barrel 9 together with the group of movable lenses 8 to move back and forth in the direction of the optical axis through the roller 11, focusing thus being attained. The right half portion of FIG. 1 shows a condition wherein the group of movable lenses 8 is located at the front end (at the upper portion of FIG. 1) and the left half portion at the rear end (at the lower portion of FIG. 1).

Figure 2:
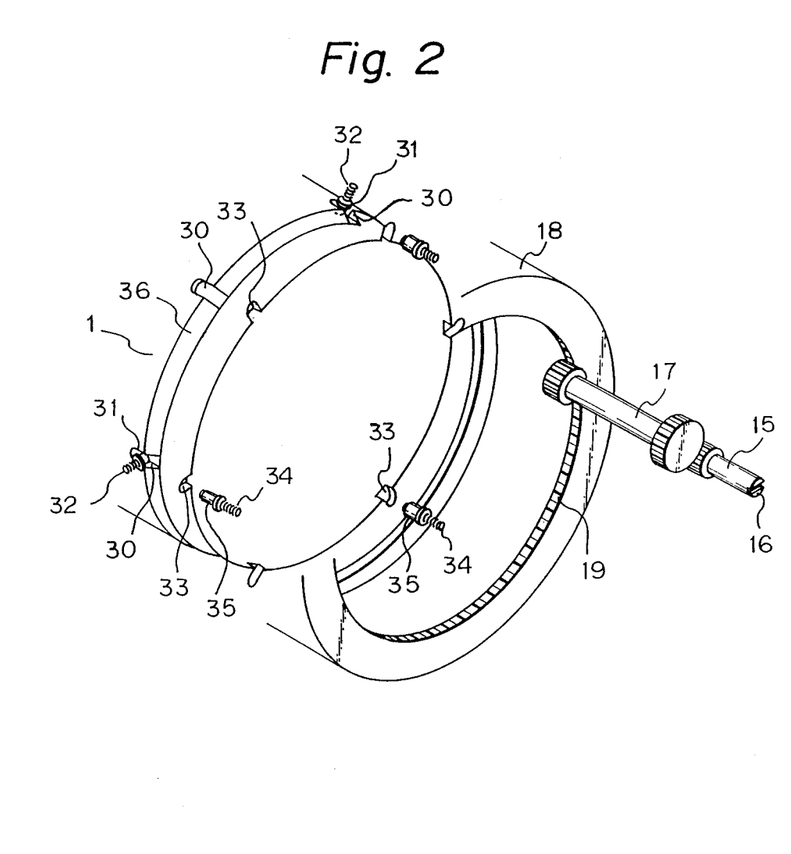
FIG. 2 is a partial perspective view of the focusing operation changeover apparatus.

As shown in FIG. 2, rotatably held at the rear end of the fixed lens barrel 1 is a joint gear 15, one end of which has a slit 16 formed thereon, the slit 16 being exposed toward the outside. A drive shaft 51 (in FIG. 7) driven by a motor 52 installed inside the camera body is connected to the slit 16. An idler gear 17 is adapted to engage with the joint gear 15 so as to transfer rotation thereof. A ring 18 is rotatably fitted inside the outer barrel of the fixed lens barrel 1 and is adapted to show a range scale, and a gear 19 having inner teeth is formed inside the range scale ring 18 in such a way as to be engageable with the idle gear 17, whereby rotation of the joint gear 15 by the motor acts to rotate the range scale ring 18 through the idle gear 17.

Marked on the outer periphery of the range scale ring 18 is the range scale which shows the range of a distance at which an object is brought into focus; the range scale is designed to be visible from the outside through a transparent portion which is not shown in the drawing. The head of a machine screw 21 projectingly provided on the cam barrel 14 is engaged with a groove 20 formed inside the range scale ring 18, the connecting machine screw 21 thereby connecting the range scale ring 18 to the cam barrel 14 so that both are able to rotate together.

Reference numerals 22 and 23 are respectively a manual control ring and a changeover control ring which are rotatably fitted over the fixed lens barrel 1 at the central position thereof where easy operation of the rings can be attained. A straight groove 24 is formed in the axial direction of the ring on the inner periphery of the control ring 22, and a claw 25 is formed on the changeover control ring 23 in such a way that it may be brought into engagement with the straight groove 24. The control ring 22 and the changeover control ring 23 are designed to rotate integrally through the claw 25 and the straight groove 24, only the changeover control ring 23 being able to slide in the axial direction thereof. The right half portion of FIG. 1 shows a condition wherein the changeover control ring 23 is located at the front end thereof, an enlarged view thereof being shown in FIG. 3. The left half portion of FIG. 1 shows a condition wherein the changeover control ring 23 is at its rear end, an enlarged view thereof similarly being shown in FIG. 4.

Referring also to the enlarged views shown in FIGS. 3 and 4, the perimeter of the changeover control ring 23 will be described hereinbelow.

Click grooves 26 and 27 are each spaced and formed around the outer periphery of the fixed lens barrel. A click ball 28 installed in a hole formed in the inner periphery of the control ring 23 is forced into engagement with either of the click grooves 26 and 27 by a spring 29. Once the ball 28 is brought into engagement with one of the grooves, force larger than a certain level is needed to slide the changeover control ring 23, the engaged condition otherwise being maintained.

Immediately behind the click grooves 26 and 27 are formed fixing grooves 30 extending in the direction of the optical axis, for example, at six points around the outer periphery of the fixed lens barrel 1. FIG. 2 is a perspective view of this part. Lock pins 31 are installed in holes formed in the inner periphery of the changeover control ring 23 and are biased inwardly by springs 32 so as to be brought into engagement with the fixing slots 39, as shown in FIG. 3.

Figure 3:
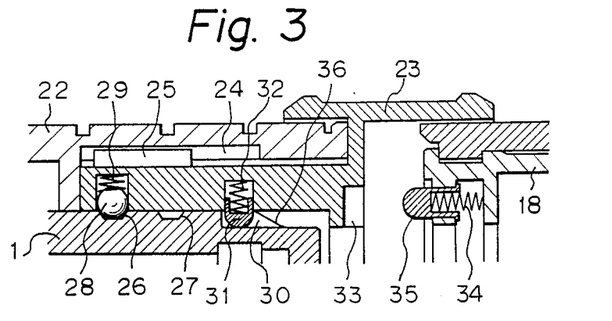
FIGS. 3, 4, 5 and 6 are enlarged partial cross-sectional side views showing different operating conditions.

As shown in FIG. 3, in the condition wherein the click ball 28 is in engagement with the forward click groove 26, the lock pins 31 are brought into engagement with the fixing grooves 30, wherein the changeover control ring 23 is locked so as not to be rotated, the control ring 22 also being thereby prevented from rotating. Although the lock pins 31 are provided at three points around the periphery in this embodiment, the number of lock pins provided is not necessarily restricted to that number.

Figure 4:
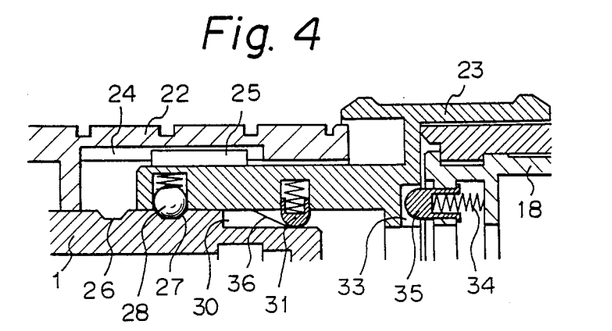

The fixing slots 30 are open at the rear ends thereof, and as is shown in FIG. 4, the click ball 28 is brought into engagement with the backward click groove 27, where the lock pins 31 are released from the slots 30 through the free ends thereof. Connecting slots 33 formed, for example, at six points around the periphery of the rear end face of the changeover control ring 23 are brought into engagement with connecting pins 35 provided at the front end of the range scale ring 18 and biased forward by springs 34, whereby the changeover control ring 23 and the range scale ring 18 are made to rotate integrally. In this condition, rotation of the manual control ring 22 enables the group of movable lenses 8 to move back and forth in the direction of the optical axis. One or a plurality of connecting pins 35 may be provided.

Figure 5:
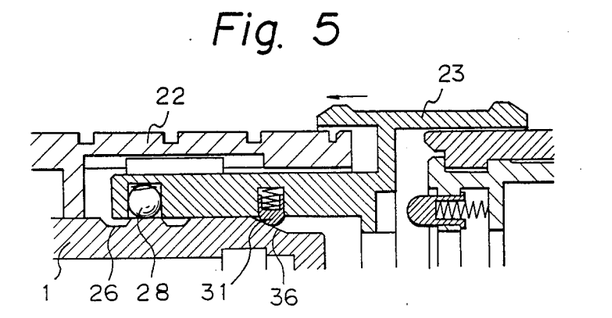

The back of the free end side of the fixing slot 30 is beveled to form a slope 36. Therefore, when the changeover control ring 23 is moved from the rear to the front position, unless the lock pins 31 are in alignment with the straight slots 30, the lock pins 31 are, as shown in FIG. 5, made to move along the slopes 36 and to be eventually pushed back into the holes, whereby the changeover control ring 23 is able to slide to the extreme front. At this point the changeover control ring 23 remains free to rotate as the lock pins 31 are not engaged with the straight slots 30. After a certain amount of rotation, however, the lock pins 31 are brought into engagement with the slots 30, whereby rotation thereof is regulated.

Figure 6:
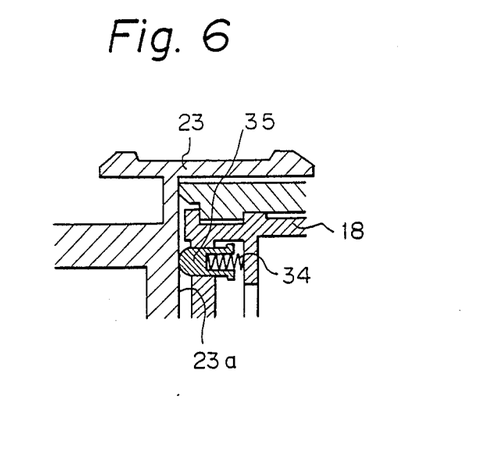

In contrast with this, when the changeover control ring 23 is pulled backward, unless the connecting pins 35 are in alignment with the connecting slots 33, as shown in FIG. 6, the connecting pins 35 are pressed by the rear wall 23a of the changeover control ring 23, the springs 34 being thereby contracted. In this condition, a certain amount of rotation of the changeover control ring 23 brings the connecting pins 35 into engagement with the connecting slots 33, whereby the control ring 22 is connected to the group of movable lenses 8, which condition is illustrated in FIG. 4.

Figure 7:
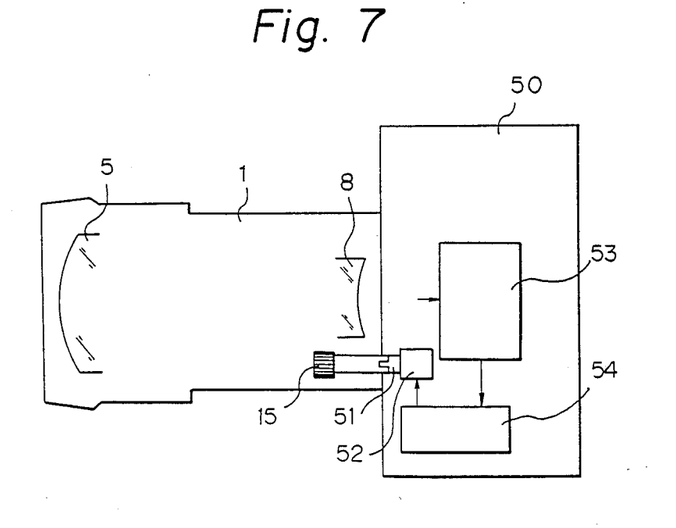
FIG. 7 is a block diagram of the automatic focusing device inside a camera body.

FIG. 7 is a block diagram of an automatic focusing apparatus provided inside a camera body 50, the apparatus comprising a motor 52 connected to the joint gear 15 through a drive shaft 51, a focus detector 53 for detecting the best focus point through a light image that has passed through groups of the lenses 5 and 8, and a motor control device 54 for controlling rotation of the motor 52 through output signals from the focus detector 53.

According to the above embodiment constructed as described above, when taking photos by utilizing automatic focusing, the changeover control ring 23 is set at the front position as shown in FIG. 3. In this condition, as the connecting pins 35 are not engaged with the connecting slots 33, the range scale ring 18 is free to be rotated by the motor and the group of movable lenses 8 are able to move back and forth, whereby focusing is accomplished. The control ring 22 and the changeover control ring 23 are locked so as not to rotate, the apparatus being thus rendered capable of being held stably by the user's hand.

When manual focusing is performed, the changeover control ring 23 is slid to the rear position as shown in FIG. 4. In this condition, rotation of the control ring 22 moves the group of movable lenses 8 back and forth in the direction of the optical axis through a member such as the changeover control ring 23, manual focusing being thus accomplished. An electric switch of the automatic focusing device may be designed to be turned off in conjunction with setting the changeover control ring 23 at the rear position.

In order to restore automatic focusing, the changeover control ring 23 is slid forward, as shown in FIG. 5, irrespective of the rotational position thereof, a connection between the control ring 22 and the group of movable lenses 8 being thus cut off.

Although in this invention only the rear group of photographic lenses are designed to move back and forth to perform focusing, the front group of lenses may be adapted to move back and forth, or the entire group of lenses may be adapted to do the same.

As described above, according to this invention, manual focusing is attained by controlling the control ring. When automatic focusing is performed, the control ring is able to be disconnected from the focusing mechanism by the changeover control ring so as to cut off the connection between the control ring and the photographic lenses. Due to this, even if the user's hand is touching the control ring during the automatic focusing operation, the motor has no load imposed on it. Therefore, the control ring may be provided at a position convenient for operation thereof, or a larger control ring can be provided for easy operation.

While the invention has been described with reference to a specific embodiment chosen for purposes of illustration, it should be apparent that numerous modifications could be made thereto by those skilled in the art without departing from the basic concept and scope of the invention.

I claim:

1. A focusing operation changeover apparatus adapted for use in a camera, said camera being capable of use in both an automatic focus condition and a manual focus condition, said changeover apparatus comprising:
   (a) a group of photographic lenses which are freely moveable in opposite directions along the optical axis of said camera;
   (b) automatic focusing means for moving said photographic lenses along said optical axis in accordance with a focusing signal in order to achieve automatic focusing;
   (c) a manual focus control ring for moving said group of photographic lenses along said optical axis, said manual control ring being rotatable about said optical axis and being prevented from moving along said optical axis;
   (d) a rotatable changeover ring for selectively disconnecting the manual focus control ring from said group of photographic lenses, wherein said changeover ring and said manual focus control ring comprise separate rings;
   (e) means for preventing said manual focus control ring and said changeover ring from rotating when said camera is in said automatic focus condition; and
   (f) means for moving said changeover ring between an automatic focus position and a manual focus position irrespective of the position of the photographic lenses.

2. A focusing operation changeover apparatus for a camera according to claim 1, wherein said barrel is a lens barrel positioned about the optical axis of said camera and wherein said manual control ring is adapted to rotate around said lens barrel.

3. A focusing operation changeover apparatus for a camera according to claim 2, wherein said changeover ring is generally annular and further wherein said manual control means is selectively connected to said photographic lenses for focusing operations via said changeover ring, wherein the connection between said manual control ring and said photographic lenses is cut off by moving said changeover control ring in the direction of the photographic axis.

4. A focusing operation changeover apparatus for a camera according to claim 1, wherein when said camera is in said automatic focus condition rotation of said changeover ring is prevented wherein the connection between said manual control ring and said group of photographic lenses is cut off when said camera is in said automatic focus condition.

5. A focusing operation changeover apparatus for a camera according to claim 4, wherein said changeover ring includes means for maintaining said changeover ring in both said automatic focus position and said manual focus position said maintaining means comprising a click ball positionable in grooves on said barrel.

6. A focusing operation changeover apparatus for a camera according to claim 1, wherein said changeover ring has at least one connecting pin which is biased by a spring and wherein said apparatus further comprises a plurality of connecting slots in an additional ring which are adapted to face each said connecting pin, each said connecting pin being adapted to be brought into engagement with a respective one of said connecting slots, so that said manual control means and said photographing lenses will be thus connected.

7. A focusing operation changeover apparatus for a camera according to claim 1, wherein said automatic focusing means is always connected to said group of photographic lenses.

8. A focusing operation changeover device in accordance with claim 1, further comprising a range scale ring attached to a barrel of said camera and including distance information, said distance information being visible at least when said camera is in said automatic focus condition.

9. A focusing operation changeover apparatus for use in a camera, said camera being capable of use in both an automatic focus condition and a manual focus condition, said changeover apparatus comprising:
   (a) a group of photographic lenses which are freely movable in opposite directions along the optical axis of said camera;
   (b) automatic focusing means for moving said photographic lenses along said optical axis in accordance with a focusing signal in order to achieve automatic focusing;

(c) a manual focus control ring for moving said group of photographic lenses along said optical axis, said manual control ring being rotatable about said optical axis and being prevented from moving along said optical axis;

(d) a changeover ring for selectively disconnecting the manual focus control ring from said group of photographic lenses, wherein said changeover ring and said manual focus control ring comprise separate rings;

(e) means for preventing said manual focus control ring and said changeover ring from rotating when said camera is in said automatic focus condition;

(f) means for moving said changeover ring between automatic focus position and a manual focus position irrespective of the position of the photographic lenses; and (g) a rotatable range scale ring, wherein said changeover ring is slidable along said optical axis and is adapted to engage said range scale ring when said camera is in said manual focus condition.

10. A changeover apparatus in accordance with either of claims 8 or 9, wherein neither said manual focus control ring nor said changeover ring have a distance scale thereon.

11. A focusing changeover apparatus in accordance with either of claims 1 or 9, comprising a motor for driving said lenses in an automatic focusing operation, said range scale ring being further rotatably driven by said motor in said automatic focus condition of said camera.

12. A focusing operation changeover apparatus adapted for use in a camera, said camera being capable of use in both an automatic focus condition and a manual focus condition, said changeover apparatus comprising:

(a) a group of photographic lenses which are freely moveable in opposite directions along the optical axis of said camera;

(b) automatic focusing means for moving said photographic lenses along said optical axis in accordance with a focusing signal in order to achieve automatic focusing;

(c) a manual focus control ring for moving said group of photographic lenses along said optical axis, said manual control ring being rotatable about said optical axis and being prevented from moving along said optical axis;

(d) a changeover ring for selectively disconnecting the manual focus control ring from said group of photographic lenses, wherein said changeover ring and said manual focus control ring comprise separate rings;

(e) means for preventing said manual focus control ring and said changeover ring from rotating when said camera is in said automatic focus condition;

(f) means for moving said changeover ring between an automatic focus position and a manual focus position irrespective of the position of the photographic lenses; and (g) a range scale ring attached to a barrel of said camera and including distance information, and a plurality of connecting pins rotatable with said range scale ring, said distance information being visible at least when said camera is in said automatic focus condition, wherein said changeover control ring is slidable along said optical axis and has a rear surface which includes a plurality of openings adapted to engage said connecting pins when said camera is in said manual focus condition.

13. A focusing operation changeover apparatus in accordance with claim 12, wherein said connecting pins are positioned on said range scale ring.

14. A focusing operation changeover apparatus for use in a camera, said camera being capable of use in both an automatic focus condition and a manual focus condition, said changeover apparatus comprising:

(a) a group of photographic lenses which are freely movable in opposite directions along the optical axis of said camera;

(b) automatic focusing means for moving said photographic lenses along said optical axis in accordance with a focusing signal in order to achieve automatic focusing;

(c) a manual focus control ring for moving said group of photographic lenses along said optical axis, said manual control ring being rotatable about said optical axis and being prevented from moving along said optical axis;

(d) a changeover ring for selectively disconnecting the manual focus control ring from said group of photographic lenses, wherein said changeover ring and said manual focus control ring comprise separate rings;

(e) means for preventing said manual focus control ring and said changeover ring from rotating when said camera is in said automatic focus condition;

(f) means for moving said changeover ring between an automatic focus position and a manual focus position irrespective of the position of the photographic lenses; and (g) a range scale ring attached to a barrel of said camera and including distance information, and a plurality of connecting pins rotatable with said range scale ring, said distance information being visible at least when said camera is in said automatic focus condition, wherein said changeover ring is slidable along said optical axis and has a rear surface which includes a plurality of openings adapted to engage said connecting pins when said camera is in said manual focus condition, wherein each of said pins is adapted to be received in any of said openings.

15. A focusing operation changeover apparatus in accordance with claim 14, wherein said connecting pins are positioned on said range scale ring.

16. A focusing operation changeover apparatus for use in a camera, said camera being capable of use in both an automatic focus condition and a manual focus condition, said changeover apparatus comprising:

(a) a group of photographic lenses which are freely movable in opposite directions along the optical axis of said camera;

(b) automatic focusing means for moving said photographic lenses along said optical axis in accordance with a focusing signal in order to achieve automatic focusing;

(c) a manual focus control ring for moving said group of photographic lenses along said optical axis, said manual control ring being rotatable about said optical axis;

(d) a changeover ring for selectively disconnecting the manual focus control ring from said group of photographic lenses;

(e) means for moving said changeover ring between an automatic focus position and a manual focus position irrespective of the position of the photographic lenses; and (f) a range scale ring attached to a barrel of said camera and including distance information, and a plurality of connecting pins rotatable with said range scale ring, said distance information being visible at least when said camera is in said automatic focus condition, wherein said changeover ring is slidable along said optical axis and has a rear surface which includes a plurality of openings adapted to engage said connecting ring when said camera is in said manual focus condition, wherein each of said pins is adapted to be received in any of said openings.

17. A focusing operation changeover apparatus in accordance with claim 16, wherein said connecting pins are positioned on said range scale ring.

18. A focusing operation changeover apparatus for use in a camera, said camera being capable of use in both an automatic focus condition and a manual focus condition, said changeover apparatus comprising:

(a) a group of photographic lenses which are freely moveable in opposite directions along the optical axis of said camera;

(b) automatic focusing means for moving said photographic lenses along said optical axis in accordance with a focusing signal in order to achieve automatic focusing;

(c) a manual focus control ring for moving said group of photographic lenses along said optical axis, said manual control ring being rotatable about said optical axis;

(d) a changeover ring for selectively disconnecting the manual focus control ring from said group of photographic lenses;

(e) means for moving said changeover ring between an automatic focus position and a manual focus position irrespective of the position of the photographic lenses; and (f) a range scale ring attached to a barrel of said camera and including distance information, and a plurality of connecting pins rotatable with said range scale ring said distance information being visible at least when said camera is in said automatic focus condition, wherein said changeover ring is slidable along said optical axis and has a rear surface which includes a plurality of openings adapted to engage said connecting pins when said camera is in said manual focus condition, wherein each of said pins is adapted to be received in any of said openings, wherein neither said manual focus control ring nor said changeover ring have a distance scale thereon.

19. A focusing operation changeover apparatus in accordance with claim 18, wherein said connecting pins are positioned on said range scale ring.

* * * * *

UNITED STATES PATENT AND TRADEMARK OFFICE
CERTIFICATE OF CORRECTION

PATENT NO. : 4,893,145
DATED : January 9, 1990
INVENTOR(S) : A. MATSUDA

It is certified that error appears in the above-identified patent and that said Letters Patent is hereby corrected as shown below:

Column 1, line 38, change "with," to ---, with---.
Column 6, line 27, in claim 4, line 3, insert ---,--- after "condition".
Column 6, line 28, in claim 4, line 4, insert ---,--- after "prevented".
Column 7, line 23, in claim 10, line 23, change "3" to ---1---.

Signed and Sealed this

Second Day of June, 1992

*Attest:*

DOUGLAS B. COMER

*Attesting Officer*         Acting Commissioner of Patents and Trademarks